(12) United States Patent
Reinhart et al.

(10) Patent No.: US 6,700,705 B1
(45) Date of Patent: *Mar. 2, 2004

(54) STRUCTURE ARRANGEMENT HAVING AN OPTICAL-DIFFRACTION EFFECT

(75) Inventors: Werner Reinhart, Nürnberg (DE); Jürgen Herrmann, Alsbach (DE)

(73) Assignees: Leonhard Kurz GmbH & Co., Furth (DE); Deutsche Bundesbank, Frankfurt am Main (DE)

( * ) Notice: Subject to any disclaimer, the term of this patent is extended or adjusted under 35 U.S.C. 154(b) by 0 days.

This patent is subject to a terminal disclaimer.

(21) Appl. No.: 08/765,295

(22) PCT Filed: Jun. 22, 1995

(86) PCT No.: PCT/DE95/00828

§ 371 (c)(1), (2), (4) Date: Jan. 27, 1997

(87) PCT Pub. No.: WO96/01458

PCT Pub. Date: Jan. 18, 1996

(30) Foreign Application Priority Data

Jul. 2, 1994 (DE) .......................... 44 23 295

(51) Int. Cl.[7] .............. G02B 5/18; G03H 1/00

(52) U.S. Cl. ............... 359/569; 359/567; 359/566; 359/2; 283/86

(58) Field of Search ............. 359/2, 1, 567, 359/569, 572, 573, 574; 283/86, 91

(56) References Cited

U.S. PATENT DOCUMENTS

| | | | | |
|---|---|---|---|---|
| 4,568,141 A | * | 2/1986 | Antes | 359/2 |
| 5,032,003 A | * | 7/1991 | Antes | 359/569 |
| 5,379,131 A | * | 1/1995 | Yamazaki | 359/2 |
| 5,627,663 A | * | 5/1997 | Horan et al. | 359/572 |
| 6,243,202 B1 | * | 6/2001 | Wilhelm | 359/1 |

* cited by examiner

*Primary Examiner*—Audrey Chang
(74) *Attorney, Agent, or Firm*—Hoffmann & Baron, LLP

(57) ABSTRACT

In order to improve a structure arrangement comprising a plurality of portions having a relief structure with an optical-diffraction effect, in particular for visually identifiable optical security elements for value-bearing documents, for example banknotes, credit cards, passes or cheque documents, or other articles to be safeguarded, in such a way that it can give a viewer an image impression which in particular is more homogenous and more brilliant than is possible with known structure arrangements, it is proposed that a predominant number of the portions is of strip or band configuration.

9 Claims, 3 Drawing Sheets

STRUCTURE ARRANGEMENT HAVING AN OPTICAL-DIFFRACTION EFFECT

BACKGROUND OF THE INVENTION

The invention concerns a structure arrangement comprising a plurality of portions having a relief structure which has an optical-diffraction effect, in particular for visually identifiable, optical security elements for value-bearing documents, for example banknotes, credit cards, passes or cheque documents, or other items to be safeguarded.

In the simplest case a structure arrangement of that kind is afforded by a rectilinear wave or corrugation structure which is disposed on the surface of a carrier element and at which incident ambient light is reflected with diffraction and/or refraction. In the form of the reflected light, a viewer can receive a visually perceptible item of information which corresponds to the relief structures of the portions, which structures have an optical-diffraction effect, the information being dependent inter alia on the viewing angle.

Diffraction of incident ambient light at the relief structures of the portions and thus the information which is emitted therefrom in the form of an optical diffraction image are determined by the number of wave or grating lines per unit of length of a portion, the so-called spatial frequency, and by the cross-sectional shape of the relief structure which is defined inter alia by the differences in respect of height in the relief structure, more specifically both by the differences in respect of height between the individual raised portions relative to each other, and also between raised portions and troughs of the relief structure. The relief structures of the portions can be of such a configuration and the portions can be so arranged that a given item of information can be emitted in a given viewing angle range and thus perceived by a viewer, while in another viewing angle range no information or another item of information can be perceived.

By virtue of the use of per se known security elements with a structure arrangement having an optical-diffraction effect, in regard to the articles to be safeguarded, as were referred to in the opening part of this specification, it is possible for items of authenticity information in respect of the safeguarded article to be rendered visible even to the unpractised lay person, and at the same time for forgery, for example in the form of duplication, having regard to known forgery procedures, in particular optical duplication procedures, to be rendered impossible or made sufficiently difficult.

The endeavour is so to design a structure arrangement that a visually perceptible item of information produced therefrom satisfies aesthetic aspects so that a viewer has for example a particularly brilliant or highly homogenous, uniform image impression which in particular can include a symbol or character which provides an item of information. However the endeavour can also be to arouse, on the part of the viewer, the impression of a particularly brilliant colour representation or the impression of highly homogenous uniform colouring (including within larger surface portions). It is frequently also desirable to produce with the utmost sharpness and precision a change in the information, as can be caused for example by varying the viewing angle, for example by pivoting the carrier element which carries the structure arrangement, about an axis which is in the plane of the carrier element, or by rotating it about a notional axis perpendicular to that plane. In the past, the attempt was made to achieve that by using structure arrangements with portions as the smallest carrier unit of a given item of optical information, so-called pixels, the dimensions of which were of the order of magnitude of 60×60 $\mu$m, which therefore can no longer be resolved with the naked eye. It was therefore possible, on a given macroscopically perceptible area, to provide a plurality of portions which give mutually different items of optical information and which can be "activated" simultaneously or singly in dependence on the abovementioned viewing parameters. In order further to enhance the impression of homogenous uniform image perception, it has already been proposed that the size of the portions is to be further reduced. Due to the accordingly required larger number of correspondingly smaller portions however that procedure suffers from the disadvantage that the influence of the edges of the portions on the diffraction image produced increases, insofar as there are undesirable additional diffraction phenomena which are caused by the transition from one relief structure within a portion to a further relief structure in adjoining portions. Furthermore, that measure reduces the effective degree of utilisation of the surface area in the structure arrangement as the number and therewith the total area of the regions which do not contribute to affording information are drastically increased, for example the corner regions of a square portion with in particular arcuately curved relief lines whose length decreases towards the corners.

SUMMARY OF THE INVENTION

The object of the present invention is to improve a structure arrangement of the kind set forth in the opening part of this specification, in such a way that it is superior to conventional structure arrangements in regard to the brilliance and the homogeneity of the image impressions afforded and also in regard to the exactitude of changes, which can be achieved by means of the structure arrangement, between different image impressions, while the structure arrangement can be produced in a simple and economical manner.

In accordance with the invention, in a structure arrangement of the kind set forth in the opening part of this specification, that object is attained in that a predominant number of the portions is of a strip or band configuration and has a transverse extent which can no longer be resolved with the naked eye and is below 0.3 nm.

In this context the term strip or band configuration means that the longitudinal extent of the portions is a multiple of their transverse extent. Thus, with such a structure arrangement, the number and the total area of the regions which do not contribute to providing optical information, within the structure arrangement, can be reduced. The invention further provides that the undesired influence of the transitional regions between relief structures of mutually adjoining portions on the desired diffraction image which affords a given item of information is reduced by drastically reducing the edge length of the portions. The fact that the portions of strip or band configuration have a transverse extent which can no longer be resolved with the naked eye and is below 0.3 mm means that a viewer also has the impression of a uniform homogenous colour sensation. Preferably the transverse extent is selected to be very much smaller, but is more than 3 $\mu$m, preferably more than 5 $\mu$m. In addition it has been found particularly advantageous for the longitudinal extent of the portions to be more than 0.3 mm; preferably portions with a longitudinal extent of more than 0.4 mm and in particular more than 0.5 mm are selected for the formation of the structure arrangement according to the invention.

It is further proposed that the portions of strip or band configuration are to be of such a design that their longitudinal extent is at least ten times their transverse extent.

It will be appreciated that a structure arrangement according to the invention can be formed, at least in a region-wise manner, from portions of a single relief structure which has an optical-diffraction effect. Structure arrangements according to the invention which comprise a first group of portions with a first structure having an optical-diffraction effect and at least one further group of portions with a structure which has an optical-diffraction effect and which is different from the first structure are found to be particularly advantageous when for example there is a wish to "store", in an in particular limited surface region of the structure arrangement, which can be perceived by a viewer, a plurality of items of optical information which are intended to give the viewer, in dependence on the above-mentioned parameters (incidence of light, viewing angle), different optical impressions which originate from the detected surface region. Particularly for the situation where a sharp, exact change in information, for example a change in colour or a change from one symbol to another, is desired, if for example the carrier element of the structure arrangement is pivoted about an axis which is disposed in the plane of the carrier element, a structure arrangement is proposed in which the portions of strip or band configuration are arranged to extend substantially at an equal spacing from each other and in particular in parallel relationship. To provide for effective utilisation of the area involved, it is further recommended that the strips or bands are of such a dimension that their longitudinal extent is determined by the extent of the structure arrangement or a part thereof, in the direction in question.

A development of the invention, of quite considerable significance, is considered to lie in solving the problem of communicating a given individual item of information in a brilliant and uniform manner over a very large viewing angle. In the past, it was possible for this to be achieved only in an unsatisfactory manner, with one and the same relief structure having an optical-diffraction effect. As mentioned above, a structure arrangement according to the invention, which effectively affords a remedy here, has groups of portions with a structure having an optical-diffraction effect, which structure differs in accordance with the allocation to respective groups, wherein the structure of portions, which are preferably located on the same surface region of the structure arrangement, of the first and at least one further group, is of such a configuration that, when the structure arrangement is illuminated, visually perceptible items of information which originate from the portions involving different group allocations are identical, as seen from different sub-ranges of said viewing angle range. In other words, for the communication of a given individual item of information in a viewing angle range, a respective group of portions is responsible for each of the various sub-ranges of that viewing angle range.

With such a structure arrangement, it is possible for example to break up a large viewing angle range into a plurality of smaller sub-ranges and to associate with each sub-range strip-like or band-like portions of a given group, in which the desired individual item of information for that sub-range is "stored" and is emitted in the form of a diffraction image into that sub-range when the structure arrangement is illuminated. In accordance with the invention, by virtue of a suitable configuration for the structure of the portions involving different group allocations and by virtue of suitable arrangements of the portions, it is possible to provide that the above-mentioned sub-ranges adjoin each other and thus, in a larger viewing angle range formed by the sub-ranges, it is possible to perceive the same item of optical information, but from portions involving different group allocations. It is recommended that the strip-like or band-like portions involving different group allocations are arranged alternately, that is to say A1/A2/A1/A2 or in accordance with a sequence A1/A1/A2/A1/A1/A2 or A1/A2/A3/A1/A2/A3.

In accordance with a further proposal, provided on an in particular limited surface region of the structure arrangement are both groups of portions A1, A2 etc. for communicating a given item of information A in sub-ranges $\alpha 1$, $\alpha 2$, etc. of a viewing angle range $\alpha$ and also groups of portions B1, B2 etc. for communicating a given other item of information B in sub-ranges $\beta 1$, $\beta 2$ etc. of another viewing angle range $\beta$. When the viewing angle ranges adjoin each other, the image impression seen by a viewer changes when he alters his direction of viewing from the viewing angle range $\beta$ into the viewing angle range $\beta$.

Another object of the present invention is to provide a transfer foil, in particular a hot stamping foil, as well as an optical security element as referred to in the opening part of this specification, for value-bearing documents or other items to be safeguarded, in which the disadvantages and difficulties which occur in connection with known structure arrangements do not arise. That object is attained by a transfer foil and by an optical security element with a structure arrangement according to the invention, which is of the configuration as described above. A further subject of the invention is a value document carrier which, instead of a security element with a structure arrangement having an optical-diffraction effect, has a security region to which a structure arrangement according to the invention was applied by a suitable transfer process, in particular by a hot stamping process.

BRIEF DESCRIPTION OF THE DRAWINGS

Further features, details and advantages of the invention are apparent from the accompanying drawings and from the following description of particularly advantageous embodiments of the structure arrangement according to the invention.

In the drawings.

DESCRIPTION OF THE PREFERRED EMBODIMENTS

Figure 1:
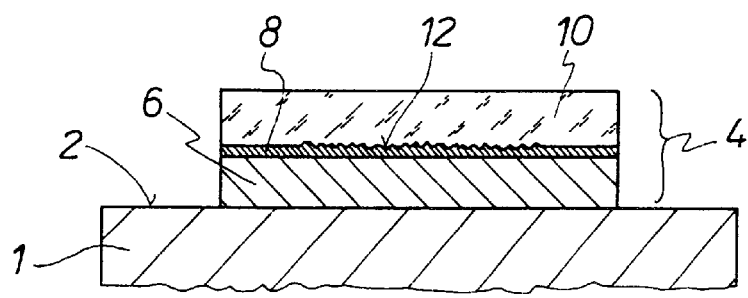
FIG. 1 is a diagrammatic view of an article to be safeguarded, with a security element.

FIG. 1 shows an article 1 to be safeguarded, for example a cheque card comprising plastic material, or the like. A security element which is generally identified by reference numeral 4 is shown on a surface 2 of the article 1 to be safeguarded. The security element 4 includes a substrate region 6, a thin metal layer 8 and a transparent cover layer 10. On its side which is towards the article 1 to be protected, the cover layer 10 has a relief-like surface structure 12 which comprises wave or grating lines—hereinafter referred to as a structure arrangement—, to which the metal layer 8 was applied, in particular by a vapour deposition procedure.

Figure 2:
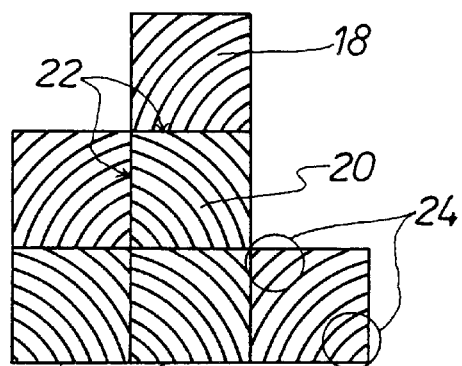
FIG. 2 shows a part of a structure arrangement in accordance with the state of the art.

FIG. 2 is a diagrammatic plan view of a structure arrangement constituting the state of the art, with portions 16 which have a relief structure 18 and 20 respectively which has an optical-diffraction effect and which corresponds to a given item of information. Reference numeral 22 denotes the edges of the portions 16, that is to say the transitional regions from a relief structure having an optical-diffraction effect, to a further relief structure. Those edges 22 cause undesired additional diffraction phenomena which falsify the optically perceptible items of information which are to be communicated by the relief structures 18 and 20. The circles identified by reference numeral 23 illustrate the regions which do not contribute to producing the desired diffraction image or which at least make a lesser contribution thereto.

Figure 3:
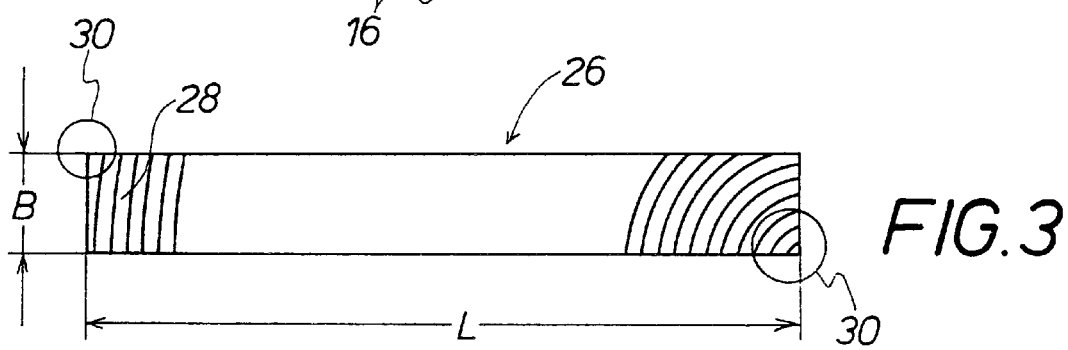
FIG. 3 shows a portion of a structure arrangement according to the invention.

FIG. 3 in contrast shows a portion 26 of a structure arrangement according to the invention. As can be seen from FIG. 3 the portion 26 is of a strip or band configuration, that is to say its longitudinal extent L is a multiple of its transverse extent B.* FIG. 3 also diagrammatically indicates a relief structure 28 which is homogenous over the portion 26. In this structure arrangement according to the invention, there are only two zones 30 in which the contribution to the diffraction image produced when the arrangement is illuminated is smaller in comparison with the rest of the surface of the portion 26.

* Translator's note: At this point the German text has a passage at page 11, line 1 to page 11, line 29 which constitutes a literal repetition of page 10, line 6 to page 10, line 34 and which has been omitted from this translation as being a clearly apparent clerical error.

Figure 4:
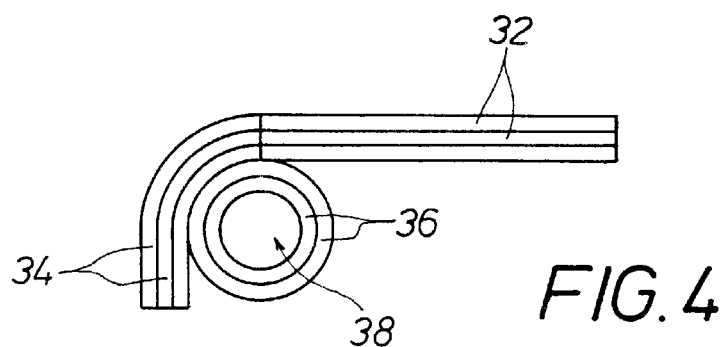
FIG. 4 shows a diagrammatic view of a further structure arrangement.

FIG. 4 shows a larger region of a structure arrangement according to the invention, in which strip-like or band-like regions 32 are arranged to extend straight and in the form of lines whereas other strip-like portions 34 are in an arcuately curved configuration and arrangement. Further portions 36 are in the form of concentric rings, a configuration which presents itself in particular when the aim is to produce a rotationally symmetrical diffraction image, that is to say if the same item of information is to be ccmmunicated to a viewer, independently of the orientation of the structure arrangement, upon rotation thereof about a notional axis when extends perpendicularly to the plane of the drawing through a point 38.

Figure 5:
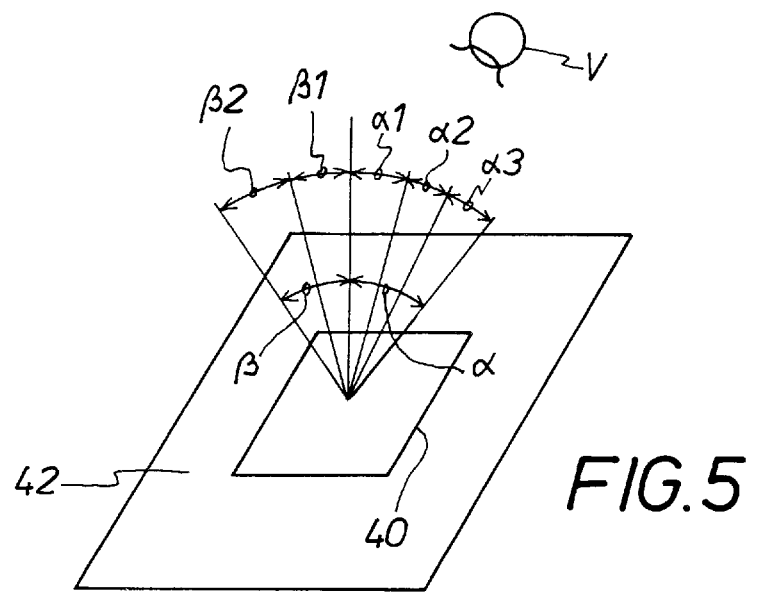
FIG. 5 shows a diagrammatic view of the optical information of the diffraction image in the case of a structure arrangement as shown in FIG. 5a or 5b, FIGS. 5a and 5b show a structure arrangement with portions arranged in a line-wise manner.
Figure 5A:
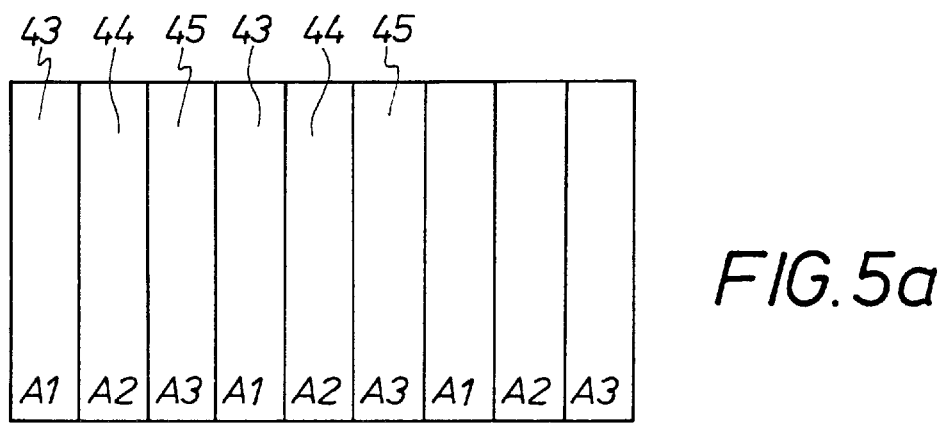

FIG. 5 is a diagrammatic view of optical information distribution, which is communicated in the form of a diffraction image, within a viewing angle range $\alpha$. Such information distribution is to be obtained in particular with a structure arrangement as is shown in FIG. 5a. In that respect, FIG. 5a is a diagrammatic view on an enlarged scale of a part of a surface region 40, as viewed by a viewer V, of a structure arrangement 42 as shown in FIG. 5.

In order to provide a uniform impression, which is as homogenous as possible, of a given item of information, for example the colour impression red, over the entire viewing angle range $\alpha$, that range has been broken up into three sub-ranges $\alpha 1$, $\alpha 2$ and $\alpha 3$ which are related to portions 43 and 44 and 45 respectively of the surface region 40 of the structure arrangement 42. The portions 43, 44, 45 have relief structures A1, A2 and A3 respectively which are of such a configuration that, over the entire viewing angle range $\alpha$, a viewer V can receive the identical item of information which however within the sub-ranges $\alpha 1$, $\alpha 2$, $\alpha 3$ originates from a respective other group of portions 43, 44 and 45 respectively. The portions 43, 44, 45 are arranged for that purpose in a line-wise manner and in the sequence A1/A2/A3.

Figure 5B:
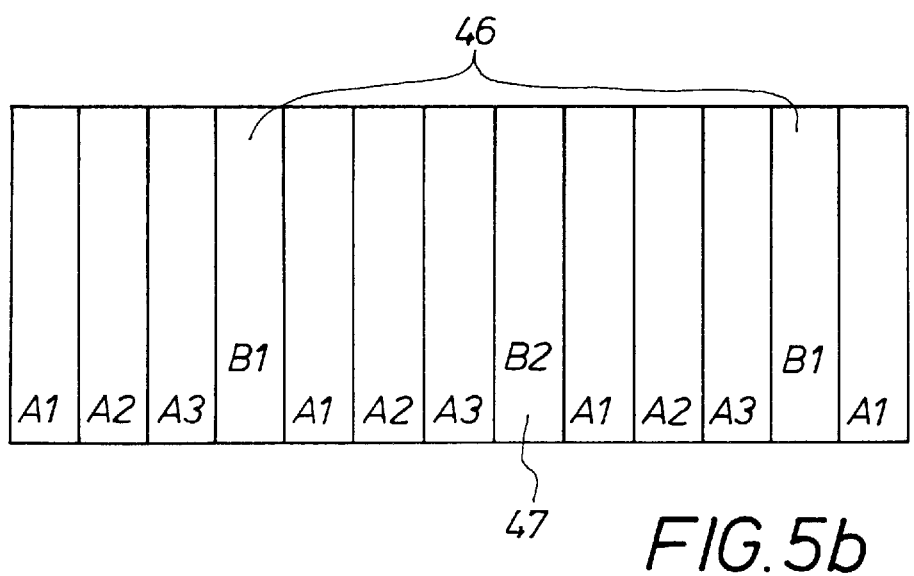

If, as shown in FIG. 5b, additional groups of portions 46, 47 with structures B1, B2 which afford another item of information, for example a representation of a character, are provided in the surface region 40, then that item of information—the representation of a character—can be perceived by virtue of suitable configuration and orientation of the portions in a viewing angle range $\beta$ or in sub-ranges $\beta 1$ and $\beta 2$, as indicated in broken lines in FIG. 5.

Figure 6:
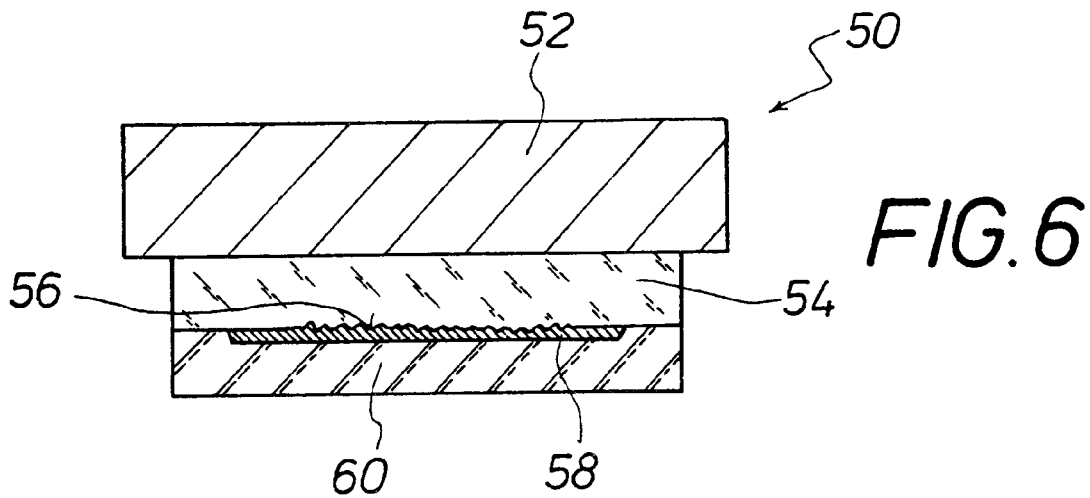
FIG. 6 shows a transfer foil with a structure arrangement according to the invention.

FIG. 6 shows a simple design in principle of a transfer foil 50 according to the invention with an upper carrier foil 52 which is to be removed after the structure arrangement has been applied to an article to be safeguarded. A transparent layer 54 with a structure arrangement 56 according to the invention adjoins the side of the carrier foil, which is towards the article to be safeguarded; the structure arrangement 56 is provided, by vapour deposition, with a thin metal layer 58. Finally the transfer foil has an adhesive layer 60, by means of which the assembly can be joined to an article to be safeguarded.

Figure 7:
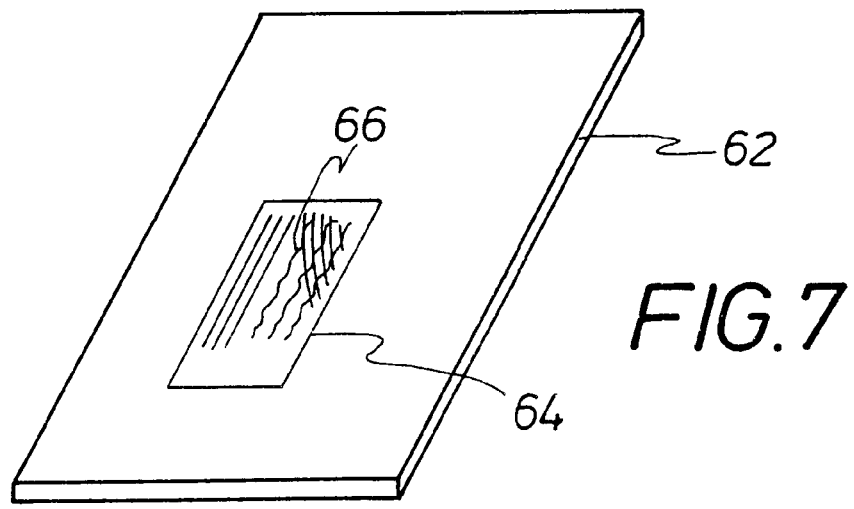
FIG. 7 shows a value document carrier with a structure arrangement having an optical-diffraction effect, which is stamped thereon.

FIG. 7 shows a value document carrier, in particular a region of a flat web 62 of a plastic material, which, instead of a security element applied to its surface, has a security region 64 with a structure arrangement 66 according to the invention which is applied by a stamping operation.

What is claimed is:

1. A structure arrangement comprising a plurality of portions, each portion having a relief structure which has an optical-diffraction effect, wherein a predominant number of the portions is of a strip or band configuration and has a transverse extent below 0.3 mm, wherein the longitudinal extent of the portions of strip or band configuration is at least ten times the transverse extent thereof and is more than 0.3 mm.

2. A structure arrangement according to claim 1 wherein the portions of strip or band configuration are arranged to extend substantially rectilinearly and in parallel relationship with each other.

3. A structure arrangement according to claim 1 wherein it has a first group of portions with a first structure having an optical-diffraction effect and at least one further group of portions with a structure having an optical-diffraction effect, said structure differing from the first structure.

4. A structure arrangement according to claim 3 wherein the structure of the portions of the first group and the at least one further group respectively is such that, upon illumination of the structure arrangement, visually perceptible items of information originating from the portions of different groups are identical, viewed from different sub-ranges of a viewing angle range.

5. A structure arrangement according to claim 4, wherein the portions of the first group and the at least one further group are arranged alternately or sequentially.

6. A structure arrangement according to claim 4 wherein the structures of the portions are of such a configuration and the portions are arranged in such a way that the various angle sub-ranges adjoin each other.

7. A structure arrangement according to claim 6, wherein the portions of the first group and the at least one further group are arranged alternately or sequentially.

8. A structure arrangement according to claim 3, wherein the portions of the first group and the at least one further group are arranged alternately or sequentially.

9. A structure arrangement according to one of claims 1, 4, 6, 8 wherein it is arranged on a transfer foil for application to an article to be safeguarded.

* * * * *

UNITED STATES PATENT AND TRADEMARK OFFICE
CERTIFICATE OF CORRECTION

| | | |
|---|---|---|
| PATENT NO. | : 6,700,705 B1 | Page 1 of 3 |
| APPLICATION NO. | : 08/765295 | |
| DATED | : March 2, 2004 | |
| INVENTOR(S) | : Reinhart et al. | |

It is certified that error appears in the above-identified patent and that said Letters Patent is hereby corrected as shown below:

Column 2, line 41,  now reads: "the naked eye and is below 0.3 nm."

should read: --the naked eye and is below 0.3 mm.--

Column 4, line 17,  now reads "range β into the viewing angle range β."

should read: --range α into the viewing angle range β.--

Column 5, line 42,  now reads: "the same item of information is to be ccmmunicated to a"

should read: --the same item of information is to be communicated to a--

Claim 5:

now reads: "5. A structure arrangement according to claim 4, wherein the portions of the first group and the at least one further group are arranged alternately or sequentially."

should read: --5. A structure arrangement according to claim 4 wherein the structures of the portions are of such a configuration and the portions are arranged in such a way that the various angle sub-ranges adjoin each other.--

UNITED STATES PATENT AND TRADEMARK OFFICE
CERTIFICATE OF CORRECTION

| | |
|---|---|
| PATENT NO. | : 6,700,705 B1 |
| APPLICATION NO. | : 08/765295 |
| DATED | : March 2, 2004 |
| INVENTOR(S) | : Reinhart et al. |

It is certified that error appears in the above-identified patent and that said Letters Patent is hereby corrected as shown below:

Claim 6:

now reads: "6. A structure arrangement according to claim 4 wherein the structures of the portions are of such a configuration and the portions are arranged in such a way that the various angle sub-ranges adjoin each other."

should read: --6. A structure arrangement according to claim 3, wherein the portions of the first group and the at least one further group are arranged alternately or sequentially.--

Claim 7:

now reads: "7. A structure arrangement according to claim 6, wherein the portions of the first group and the at least one further group are arranged alternately or sequentially."

should read: --7. A structure arrangement according to one of claims 1 to 6 wherein it is arranged on a transfer foil for application to an article to be safeguarded.--

UNITED STATES PATENT AND TRADEMARK OFFICE
CERTIFICATE OF CORRECTION

PATENT NO. : 6,700,705 B1
APPLICATION NO. : 08/765295
DATED : March 2, 2004
INVENTOR(S) : Reinhart et al.

It is certified that error appears in the above-identified patent and that said Letters Patent is hereby corrected as shown below:

Claim 8:

now reads: "8. A structure arrangement according to claim 3, wherein the portions of the first group and the at least one further group are arranged alternately or sequentially."

should read: --8. A structure arrangement according to claim 4, wherein the portions of the first group and the at least one further group are arranged alternately or sequentially.--

Claim 9:

now reads: "9. A structure arrangement according to one of claims 1, 4, 6, 8 wherein it is arranged on a transfer foil for application to an article to be safeguarded."

should read: --9. A structure arrangement according to claim 5, wherein the portions of the first group and the at least one further group are arranged alternately or sequentially.--

Signed and Sealed this

Nineteenth Day of February, 2008

JON W. DUDAS
*Director of the United States Patent and Trademark Office*